April 9, 1968        A. R. SCOTT        3,377,109
CONTROL VALVE
Filed May 17, 1966        2 Sheets-Sheet 1
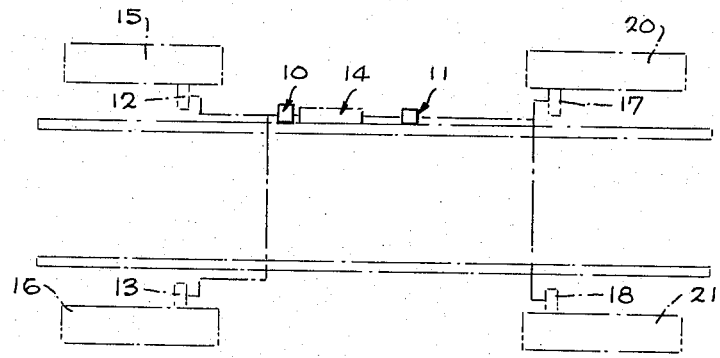
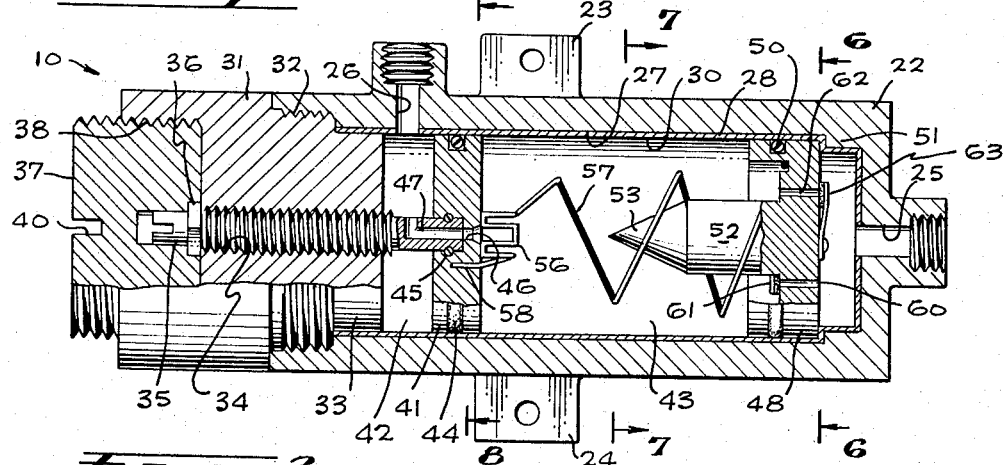
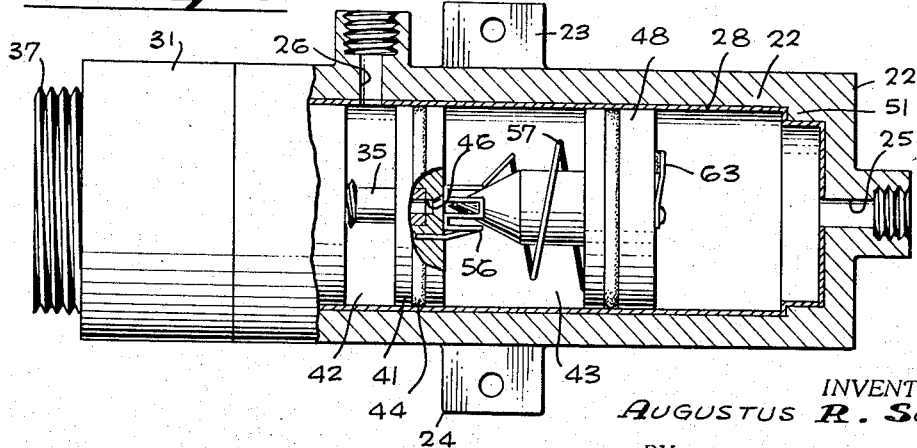
INVENTOR.
AUGUSTUS R. SCOTT
BY Roger A. Marrs April 9, 1968 A. R. SCOTT 3,377,109
CONTROL VALVE
Filed May 17, 1966 2 Sheets-Sheet 2

INVENTOR.
AUGUSTUS R. SCOTT
BY
Roger A. Marrs

United States Patent Office 3,377,109
Patented Apr. 9, 1968

3,377,109
CONTROL VALVE
Augustus R. Scott, Los Angeles, Calif., assignor of one-half to Alfred E. Porter, Sunland, Calif.
Filed May 17, 1966, Ser. No. 550,714
6 Claims. (Cl. 303—84)

ABSTRACT OF THE DISCLOSURE

A control valve for an anti-skid hydraulic brake system is disclosed herein having a closure means movably carried within the valve housing adapted to selectively close a fluid passageway responsive to panic demand by the vehicle operator. The closure means includes a piston member slidably mounted in the valve housing and resilient means adapted to interfere with closure means to maintain the fluid passageway open during normal braking operation.

---

This invention relates to control valves and more particularly to a novel anti-skid control valve incorporated into a fluid brake system for motor vehicles capable of preventing vehicle skidding under emergency or panic driving conditions.

Control of a motor vehicle as it is started, stopped or in making turns depends almost entirely upon the friction in the four small areas where the tires touch the road. Without the friction between the road and the tires, a motor vehicle will not respond in the usual way to the steering wheel, to the accelerator or to the brake. When the tread on the vehicle's tires is good, and the road is dry and smooth, there is a high degree of friction, and the vehicle can be operated to move in a predictable way so that the driver can control the vehicle. Oftentimes, a vehicle is in motion which tends to skid instead of stop when the brakes are applied. Such lack of car response when the driver operates the braking control is the result of not having enough friction between the tires and the roadway.

Not only does the vehicle move forward by means of friction, but it also stops by means of friction, i.e., friction between the tires and the road and also within the brakes. When the driver depresses the brake pedal to apply the brakes, the linings of the brake shoes are forced against the brake drums in the wheels. The friction of the brake linings against the drums slows the turning of the four wheels. This increases the friction between the tires and the road, and the car or vehicle will stop. Therefore, the key points in a brake stop are firstly, the point of contact between brake shoe and brake drum and secondly, the point of contact between tires and the road.

The efficiency of a vehicle's brakes depends on the friction between the brake lining and the brake drum. If brakes are applied too strongly or too suddenly such as under emergency or panic conditions, the friction between the brake lining and the brake drum is so much greater than the friction between the tires and the pavement that the wheels stop, or "lock." Upon this occurrence, the vehicle's tires skid and the vehicle goes out of control, because the driver cannot steer as long as the front wheels are locked. The most efficient braking and, therefore, the quickest braking is achieved by applying the brakes just short of locking. By applying the vehicle's brakes in a hard and fast manner, even in an emergency condition, the braking distance of the vehicle is lengthened and the driver loses the ability to steer the vehicle away from any collision situations.

The skidding problems and difficulties encountered when a driver or vehicle operator suddenly applies his brakes are obviated by the present invention in which a novel control valve is incorporated into a conventional brake system between the system master cylinder and the front and/or rear wheel brake cylinders. The control valve includes a body having a hydraulic fluid input port and an output port internally separated by a fluid passageway and having a closure means or mechanism selectively operable in response to the depression of the brake pedal under panic or emergency braking conditions to prevent wheel lock and therefore, the vehicle skidding. The closure mechanism includes a slidable piston member movable between the fluid passageway and the input port and that incorporates a tapered element coaxial with the passageway and being adapted to seat in the passageway to restrict or prevent flow of hydraulic fluid therethrough. A resilient restrictor is provided to prevent the closure of the fluid passageway by the piston member during normal braking conditions by allowing only limited rectilinear movement of the piston member between the fluid passageway and the input port. Resilient means are also provided for biasing the piston member towards the input port so that the fluid passageway is maintained open during normal braking conditions. By permitting slidable movement of the piston member within the valve body during normal braking conditions, the tapered element may be poised adjacent the fluid passageway after the braking procedure has been initiated so that upon a sudden or panic application of additional braking pressure on the pedal, the hydraulic fluid in the system is rendered immovable by the closure of the fluid passageway by the tapered element whereby the various wheel cylinders cannot be locked.

Therefore, it is a primary object of the present invention to provide a novel anti-skid control valve incorporated into a conventional brake system for motor vehicles which is sensitive to normal braking conditions and which is responsive to emergency or panic braking situations to prevent or restrict the flow of hydraulic fluid in the brake system which would normally result in wheel cylinder lock.

Another object of the present invention is to provide a novel anti-skid control valve for motor vehicle brake systems that is immediately responsive to emergency or panic brake pedal application to cut-off or prevent the flow of hydraulic fluid in the brake system to prevent wheel lock.

Still another object of the present invention is to provide a novel anti-skid control valve for use in motor vehicle braking systems which may be readily adjusted in sensitivity so that the valve may more readily be made selectively responsive to shut off hydraulic fluid from the actuating wheel cylinders.

Yet a further object of the present invention is to provide a novel anti-skid brake system incorporating a control valve having a piston member operable in response to normal braking conditions to control the flow of hydraulic fluid through a fluid passageway and being further responsive to emergency or panic braking conditions to close the fluid passageway so that locking of the wheel brake cylinders is avoided.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a schematic illustration of a motor vehicle brake system incorporating the novel control valve of the present invention;

FIGURE 2 is a cross-sectional view of the control valve shown in FIGURE 1 illustrating the mechanisms thereof and relative position when the brakes are not applied;

FIGURE 3 is a cross-sectional view of the control valve shown in FIGURE 1 illustrating the mechanism thereof displaced under normal application of brakes;

Figure 4:
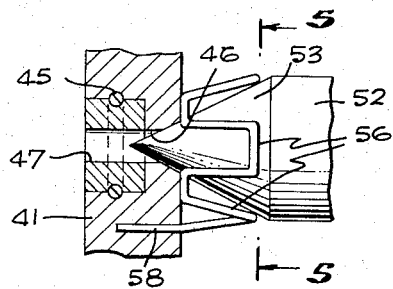
FIGURE 4 is an enlarged fragmentary view of the control valve mechanism illustrated in position under emergency or panic brake condition to prevent wheel lock and vehicle skidding.

Referring to FIGURE 1, a conventional brake system is diagrammatically illustrated incorporating the novel control valve of the present invention as indicated by numerals 10 and 11. Control valve 10 is illustrated in the brake hydraulic line between the front wheel brake cylinders 12 and 13 and a master cylinder 14. Brake cylinder 12 is employed for braking a wheel 15 while brake cylinder 13 is employed for braking a wheel 16. Control valve 11 is incorporated into the brake hydraulic line between the master cylinder 14 and wheel cylinders 17 and 18 employed for braking rear wheels 20 and 21, respectively. The interposing of the control valves 10 and 11 between the front and rear brake wheel cylinders and the master cylinder insures complete control of hydraulic fluid incorporated into the brake system for actuating the wheel cylinders. However, it is to be understood that although control valves 10 and 11 are employed for controlling the front and rear wheel brake cylinders, only control valve 10 may be employed, if desired, for control of the front wheel brake cylinder per se. All fluid pressure exerted from the master cylinder 14 responsive to brake pedal depression is under control of the control valves 10 and 11.

Referring now to FIGURE 2, control valve 10 is shown in section so that the parts and components thereof are more clearly illustrated. The control valve includes a body 22 having outwardly extending brackets 23 and 24 so that the valve may be readily attached to the chassis or other available supporting structure of the motor vehicle. The body 22 further includes an input port 25 which may be readily connected into the brake hydraulic line leading to the master cylinder 14 and an output port 26 that may be readily coupled into the brake hydraulic line leading to the wheel cylinders 12 and 13. Ports 25 and 26 communicate through a bore 27 provided in the body 22 and in which is seated a liner 28 that encloses the mechanism of the control valve. Ports 25 and 26 communicate interiorly of the liner 28 and for most intents and purposes, the inner surface 30 of the liner may be the same as the bore 27 in the body.

The end of the valve body 22 opposite to its end incorporating the input port 25 is closed by means of a retainer 31 which is secured to the end of the body by means of a threadable arrangement 32. The retainer 31 includes an annular portion 33 that seats within the bore of the liner 28 when the retainer 31 is threadably attached to the body. The periphery of annular portion 33 is precisely fitted into the open end of the liner 28 so that hydraulic fluid leakage or flow is completely prevented between the retainer and the threaded engagement with the body 22 as well as between the inner wall surface 30 of the liner and the annular portion. The retainer 31 is formed with a threaded passageway 34 which lies on the central longitudinal axis of the body 22 for rotatably receiving and mounting a stem 35. The stem 35 is maintained from rotating by means of a lock nut 36. The function and operation of stem 35 will be described later; however, access for rotating stem 35 is selectively prevented by means of a nut 37 that is threadably engaged with a bore 38 provided in the extreme end of retainer 31. For purposes of removing the nut 37 so that access may be had to the end of the stem 35 to effect the rotation thereof, nut 37 is provided with a slot 40 by which turning thereof may be achieved to remove nut 37 from its threaded engagement with the retainer 31.

Situated within the closed chamber defined by the liner surface wall 30 and in sealing engagement therewith, there is provided a base plate 41 that divides the liner cavity into chambers 42 and 43 respectively. The base 41 includes a peripheral seal 44 which may take the form of a conventional elastomeric seal or the like. Base 41 is suitably coupled to the end of stem 35 by means of a loose snap ring 45 so that the stem 35 may be rotated without causing the base to rotate. By means of the snap ring coupling, stem 35 may be rotated which will cause the base to move rectilinearly with the cavity of the liner 28 so that the base can be selectively positioned closer or further away from the input port 25. In this fashion, a convenient means of adjustment for the control valve is achieved whereby the sensitivity of control valve operation in response to brake pedal application can be realized.

Fluid communication between chambers 42 and 43 is achieved by means of a fluid passageway 46 formed in the base 41 along the central longitudinal axis of the body 22. One end of passageway 46 terminates in communication with a passageway 47 provided in the stem 35 which opens into the chamber 42. The passageway 46 opens into chamber 43 via a tapered recessed entrance formed in base 41 leading to the passageway 46. By means of this construction, fluid in chamber 43 may be transmitted into chamber 42 and hence out of the control valve through the output port 26. In the same fashion, hydraulic pressure may also be transmitted between the chambers 42 and 43 which may be developed responsive to the depression of the brake pedal to effect braking of the wheels.

Movably disposed within the cavity of the liner 28 within chamber 43, there is provided a rectilinearly moving mechanism which may be referred to as a piston member 48. Located about the periphery of member 48, is an elastomeric seal 50 which permits the member to move within the chamber 43 without leaking hydraulic fluid or pressure between the periphery of the piston member and the surface 30 of the liner. Both the liner 28 and body 22 are provided with a reduced dimensioned portion 51 which forms a shoulder against which the the piston member may abut so as to prevent the piston member from closing the input port 25. Outwardly projecting from the piston member 48 in the direction of plate or base 41, there is provided a stop member 52 having a tapered element 53 adapted to seat against the conical opening into the passageway 46 to close the passageway. Therefore, movement to the right of the piston member as shown in the drawings is limited by the shoulder portion 51 while movement to the left is limited by the engagement of the tapered element 53 with the conical opening to passageway 46.

As illustrated in FIGURE 2, the piston member is at rest against the shoulder 51 and in this position, the piston member is at rest under non-braking conditions.

With reference to FIGURE 3, the piston member 48 is illustrated midway between shoulder 51 and base 41 which is representative of a braking condition under normal circumstances. It is to be noted that passageway 46 is open inasmuch as the tapered element 53 is not seated against the conical opening thereto. The tapered element 53 is prevented from closing the passageway by means of a plurality of resilient finger members such as member 56. As the tapered element 53 moves into the center of the surrounding finger members 56, engagement occurs and the spring fingers are forced outwardly more and more as the tapered element and piston member are moved in the direction of plate or base 41. However, under normal braking conditions, the tapered element 53 will not close passageway 46 and fluid pressure may be passed therethrough between the input port 25 and the output port 26.

It is to be particularly noted that the resilient member 56 is formed from a continuous wire length having one end embedded in the base 41, its midsection formed into the plurality of convolutions forming the individual resilient fingers 56 and terminating in an enlarged helical portion 57 which seats about the member 52 at a location where member 52 joins with the piston member 48. The helical spring portion 57 is employed for forcibly urging the piston member in the direction of the input port 25 against the shoulder 51 as shown in FIGURE 2. However, upon the application of brakes, hydraulic pressure introduced via input port 25 urges the piston member 48 against the biasing of helical spring portion 57 so that the tapered element 53 enters the ring like arrangement of spring fingers 56 as shown in FIGURE 3.

Referring now to FIGURE 4, tapered portion 53 is more clearly illustrated as closing the conical entrance to the passageways 46 and 47 in response to a panic or emergency application of the brake pedal. In this mode, the piston member is urged into the ring of resilient fingers 56 so that the flow of fluid or hydraulic pressure between chambers 43 and 42 is terminated. Therefore, further hydraulic pressure is prevented from being transmitted to the individual wheel cylinders so that the individual wheel brakes cannot be locked.

Figure 5:
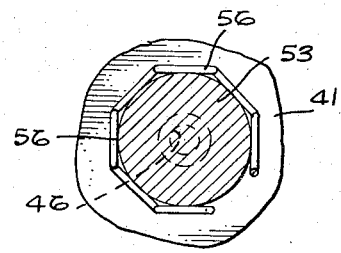
FIGURE 5 is a cross-sectional view of the control valve closure mechanism as taken in the direction of arrows 5—5 of FIGURE 4.
Figure 8:
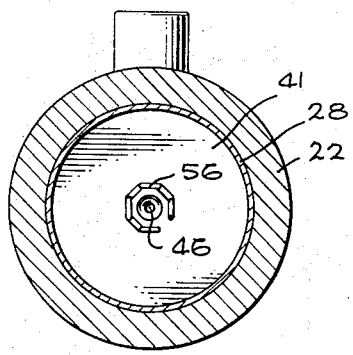
FIGURE 8 is a cross-sectional view of the control valve as taken in the direction of arrows 8—8 of FIGURE 2.
Figure 9:
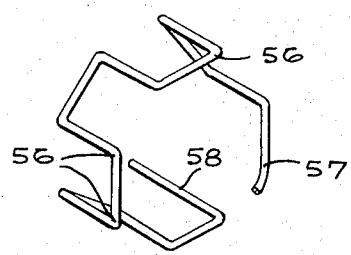
FIGURE 9 is an enlarged perspective view of a resilient mechanism restrictor employed in the control valve.

FIGURE 5 more clearly illustrates the projection of the tapered element 53 into the surrounding resilient fingers 56. Furthermore, FIGURE 8 also illustrates the surrounding arrangement of the resilient fingers with respect to the fluid passageway 46 and its conical entrance thereto. FIGURE 9 illustrates the formation of a single strand wire length into the convolutions representing spring fingers 56 wherein end 58 is secured to the base 41 and the opposite length of wire forms into the helical coil 57.

Figure 6:
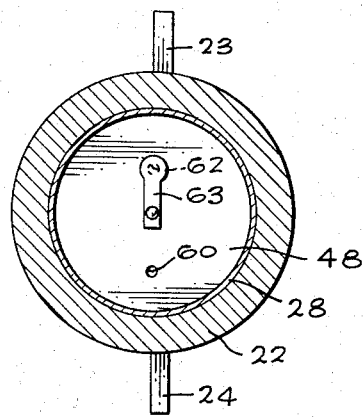
FIGURE 6 is a cross-sectional view of the control valve closure mechanism as taken in the direction of arrows 6—6 of FIGURE 2.
Figure 7:
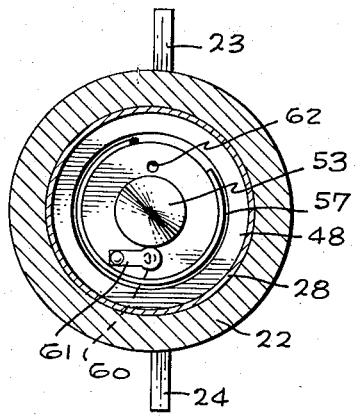
FIGURE 7 is a cross-sectional view of the control valve mechanism shown in FIGURE 2 as taken in the direction of arrows 7—7 thereof.

Referring now more specifically to FIGURES 6 and 7, a small fluid passageway 60 is operated by a spring valve 61 is provided in the piston member 48 for passing hydraulic fluid therethrough to increase the forward pressure under normal braking pressure. Such a condition is readily illustrated in FIGURE 3 wherein the piston member has been advanced in the direction of base 41 but because of the engagement of the resilient fingers with the tapered portion 53, passageway 46 remains open. Preferably, the spring tension on valve 61 must equal the strength of spring portion 57 plus the friction of piston member 48. Under this condition, it is preferred that the spring tension of the resilient fingers 56 be greater than the spring tension of the valve closing passageway 60. In this fashion, the valve 61 is only operating when normal brake operation is employed. It is to be particularly noted that the passage of fluid through the passageway 46 will be in the direction from the input port through the piston member into the chamber 43.

An additional passageway 62 is provided through the piston member 48 which is opened and closed by means of a valve 63. This valve is employed for atmospheric pressure release which greatly enhances the operating efficiency of the entire brake system.

Regarding operation of the control valve of the present invention, FIGURE 2 illustrates, as previously indicated, the position of the closure mechanism that senses the force of applied brakes represented by piston member 48 in its rearmost position adjacent shoulder 51 representing the position of the mechanism when no pressure is applied to the brake pedal and hence to the brake system. FIGURE 3 represents the position of the piston member 48 during normal braking when pressure is applied to the brake pedal so that the hydraulic fluid is under pressure in the brake system. As the pressure on the brake pedal is increased or decreased during normal driving conditions, piston member 48 senses the applied force and moves back and forth between the shoulder 51 and the resilient restricting means represented by the convolutions 56. If pressure is applied to the brake pedal to stop the automobile or motor vehicle, the tapered element 53 engages with the spring finger members 56. However, piston member 48 will cease to move towards the base plate 41 due to the resistance of the interfering spring finger members 56. In this condition, the fluid passage 46 is open so that the chambers 43 and 42 are intercommunicated.

During the operation of the motor vehicle, if the brake pedal is suddenly depressed as in a panic condition, the force exerted by the hydraulic fluid against piston member 48 will overcome the restriction of the spring finger members so that the tapered element 53 seats in the corresponding tapered entrance into passageway 46 and effects the closure thereof. Upon release of brake pedal pressure, the piston member will return to its position against shoulder 51 by means of the coil portion 57 and the return hydraulic pressure in the system.

Therefore, it can be seen that the control valve of the present invention provides a novel means for preventing a motor vehicle from skidding by interrupting the hydraulic system via passageway 46 mimediately prior to the locking of the wheel brake cylinders. The sensitivity of the control valve is readily adjusted by means of moving the base plate 41 within the cavity within liner 28 to a position closer or further away from the piston member 48. The device is economical to manufacture and installation is extremely simple. In some instances, the control valve may be incorporated into the structure of the master brake cylinder, if desired. By providing the mechanism within the liner 28, a replaceable cartridge unit is effected which may be easily interchanged for repair or maintenance purposes.

In some instances, it has been found desirable under panic braking conditions to permit the spring finger members 56 to travel against the tapered element 53 and extend over the shank of the member 52 as the member is advanced to effect closure of the passageway 46. The configuration of the spring member is suited for this purpose since the finger members can expand radially to accommodate the thickness or diameter dimension of the member 52. For such an arrangement, the tapered element is preferably elongated to an extent more than that as illustrated so that closure of the passageway will occur as the spring fingers travel along the periphery of the shank as member 52 advances.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. In an anti-skid hydraulic braking system having a master cylinder which operates a wheel cylinder brake for a vehicle wheel, the combination comprising:
    a control valve having an input port and an output port operably connected between the master cylinder and the wheel cylinder respectively and having a fluid passageway therein for conducting the passage of hydraulic fluid pressure therethrough;
    a closure means movably carried within said valve and being operable to selectively close said fluid passageway responsive to panic demand by the vehicle operator via the master cylinder so as to prevent the application of hydraulic pressure above a critical level to the wheel brake cylinder;
    a base plate mounted in said valve disposed between said input port and said output port and incorporating said fluid passageway therein so that said passageway lies substantially along the central longitudinal axis of said valve and coaxial with respect to said closure means;

said closure means includes a piston member slidably mounted in said valve between said base plate and said input port and being responsive to normal operator braking demand below said hydraulic pressure critical level to move rectilinearly therebetween without effecting the closure of said fluid passageway;

resilient means carried adjacent said base plate and adapted to interfere with said closure means to maintain said fluid passageway open during normal braking operation; and said closure means further includes an elongated tapered element fixed to said piston member and adapted to be forcibly urged past said resilient means during panic demand braking operation to seal said fluid passageway.

2. The invention as defined in claim 1 wherein said resilient means includes a length of wire formed into a plurality of convolutions encircling the entrance to said fluid passageway and being adapted to engage and restrict movement of said closure means in the direction of said base plate under normal braking operation and being adapted to pass said closure means under panic demand braking operation.

3. The invention as defined in claim 2 including a helical spring connected between said resilient means and said piston member for normally biasing said piston member away from said base plate.

4. The invention as defined in claim 3 including a hollow cylindrical liner carried in said valve and enclosing said closure means and said base plate.

5. The invention as defined in claim 3 including adjustment means movably coupled to said base plate and to said valve whereby rotary movement of said adjustment means from outside of said valve effects movement of said base plate either closer to or further away from said closure means so that selective sensitivity of said valve to panic demand braking results.

6. The invention as defined in claim 3 including a pair of passageways extending through said piston member;

spring valves carried on opposite sides of said piston member to selectively block the flow of fluid through said pair of passageways; and said spring valves having different closure rates from each other.

References Cited
UNITED STATES PATENTS

| | | | |
|---|---|---|---|
| 2,218,194 | 10/1940 | Freeman | 188—152 |
| 2,291,033 | 7/1942 | Goepfrich | 303—6 |
| 3,237,410 | 3/1966 | Sogoian | 303—84 |

MILTON BUCHLER, *Primary Examiner.*

J. McLAUGHLIN, *Assistant Examiner.*